E. H. STERLING.
SAW GRINDER.
APPLICATION FILED SEPT. 22, 1909.
981,135.
Patented Jan. 10, 1911.
4 SHEETS—SHEET 4.
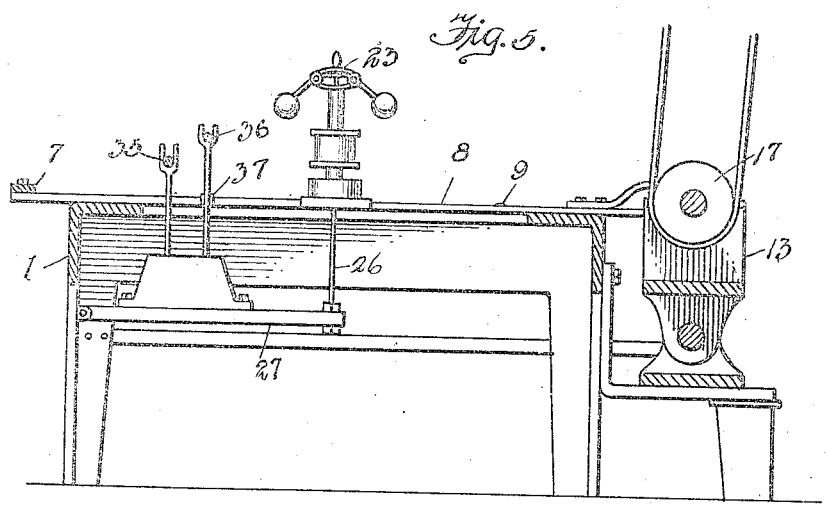
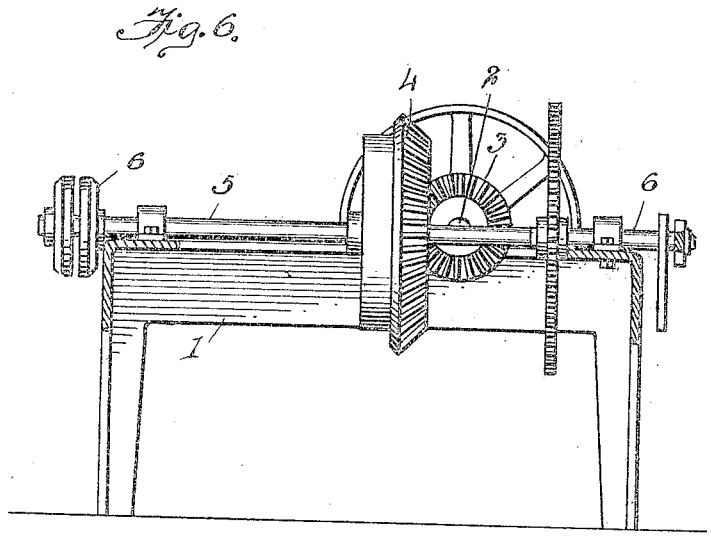

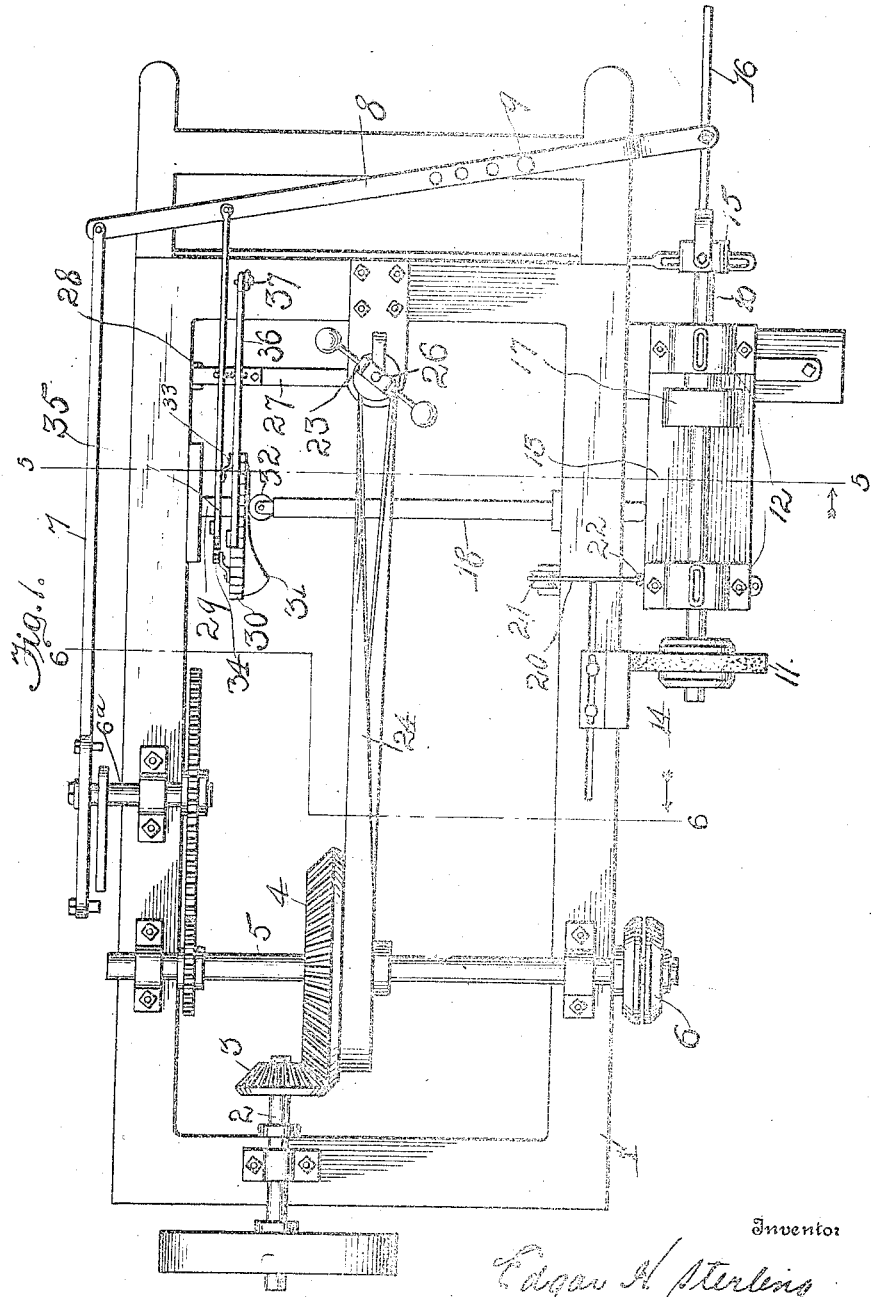

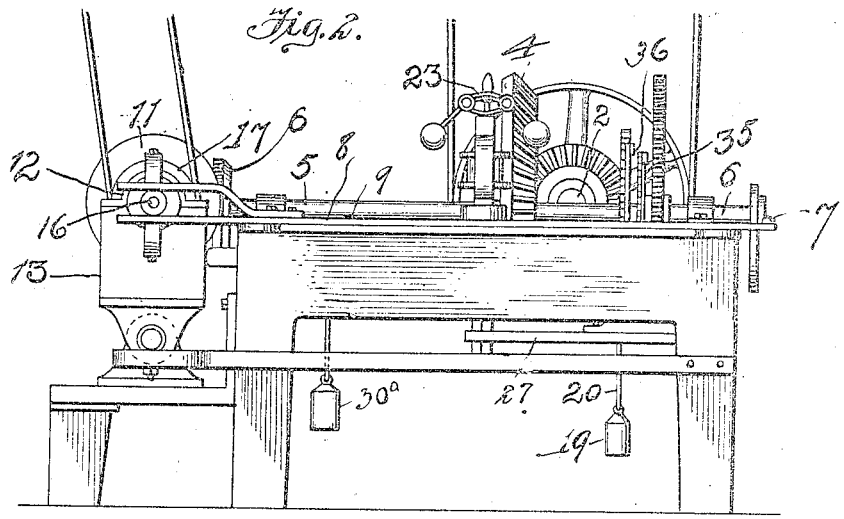

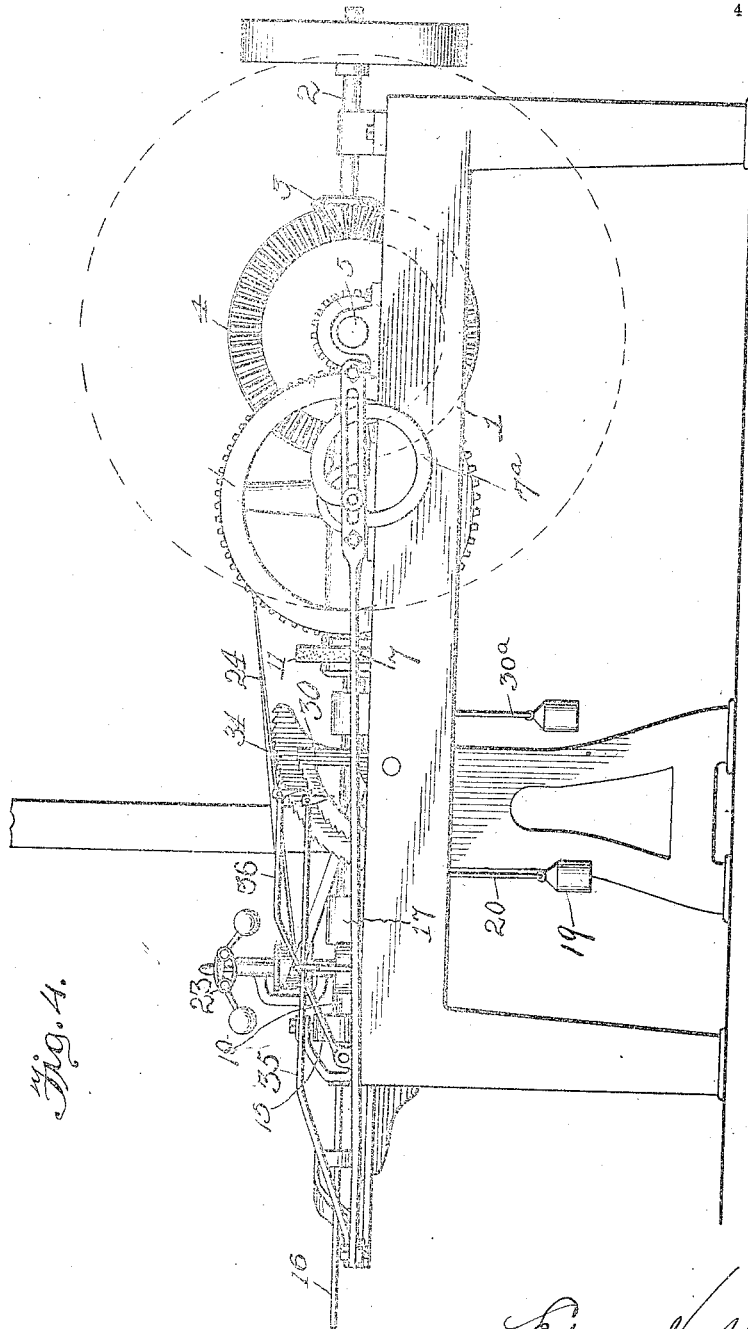

UNITED STATES PATENT OFFICE.

EDGAR H. STERLING, OF BELLINGHAM, WASHINGTON.

SAW-GRINDER.

981,135. Specification of Letters Patent. Patented Jan. 10, 1911.

Application filed September 22, 1909. Serial No. 518,909.

*To all whom it may concern:*

Be it known that I, EDGAR H. STERLING, a citizen of the United States of America, and resident of Bellingham, in the county of Whatcom and State of Washington, have invented certain new and useful Improvements in Saw-Grinders, of which the following is a specification.

This invention relates to saw grinding machines and it has for its object the provision of novel means for rotating a saw and simultaneously grinding the teeth thereof, means being provided for reciprocating the grinder simultaneously with its rotation.

A further object of this invention is to provide means for reciprocating the grinder in order to carry the grinder from contact with the saw upon interruption of the operation of the saw feeding mechanism.

A still further object of this invention is to provide a governor for controlling the action of the grinder, the said governor being made operative by variation in the speed of the saw feeding mechanism.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, illustrates a plan view of a saw grinding machine embodying the invention; Fig. 2, illustrates an elevation of one end thereof; Fig. 3, illustrates an end elevation of the opposite end; Fig. 4, illustrates an elevation of one side of the grinder; Fig. 5, illustrates a transverse sectional view on the line 5—5 of Fig. 1; Fig. 6, is a transverse sectional view on the line 6—6 of Fig. 1.

In these drawings 1, denotes a frame having a power shaft 2, journaled thereon with a beveled gear wheel 3, meshing with a gear wheel 4, on a shaft 5. The shaft 5, has a head or clamp 6, designed to hold the saw in order that the said saw may rotate with the shaft 5. The shaft 5, is geared to the front shaft 6ª, and hence said shaft 6ª, is driven to communicate motion to an eccentric 7ª actuating the pitman 7, which pitman is pivoted to a lever 8, and the lever is adjustably mounted on the pivot 9.

The shaft 10, on which a grinding wheel 11, is mounted, is journaled in the bearings 12, which bearings rest on a table 13 and the table 13 in turn is slidable with relation to the edge of the frame 1, in order that the said table may be moved toward or away from the frame. The shaft 10, is movable longitudinally in order that the grinding wheel 11, may be reciprocated with relation to the work rest 14, and by work rest is meant a support for the saw against which it is pressed when the grinding wheel 11, is in operation. The outer end of the shaft 10, is provided with a collar 15, to which the rod 16, is pivotally connected and the said rod 16 is in turn pivotally connected to the lever 8, hence as the lever 8, oscillates, the rod 16, and shaft 10, are reciprocated, and since the lever 8, takes motion from the pitman 7, and the pitman 7 is moved by the eccentric 7ª fastened to the shaft 6ª, which takes motion from the shaft 5, it follows that as the shaft 5, carries the saw which is to be operated on by the grinder, the parts are simultaneously operated from a single source of power with the exception that the shaft 10 is driven independently of the other mechanism through the medium of a pulley 17, which may be coupled to be driven in any suitable manner.

A thrust rod 18, is slidable transversely of the frame 1 and has one end projecting beyond the edge of the frame in engagement with the table 13, and this thrust rod operates to move the table away from the side of the frame opposing the action of the weight 19, which with its flexible connection 20, operating over the idler 21, and connecting with the table through the medium of an eye 22, exerts a pull on the table tending to draw the said table toward the side of the frame. When therefore, the machine is operating under normal conditions the table is drawn toward the side of the frame by the weight and the movement of the table results in carrying the grinding surface of the wheel 11, into contact with the saw which is interposed between the periphery of the said wheel and the work rest 14. When, however, the speed of the machine is decreased below the normal I provide means for actuating the thrust rod 18, in order that the table may be carried away from the side of the frame and cause a disengagement of the grinding wheel 11 and the saw.

The mechanism for operating the thrust rod 18, includes a governor 23, which has a belt 24, taking motion from the shaft 5 and the governor has a rod 26, connected at or near its lower end to a lever 27, so that as the governor operates to move the rod longitudinally, the lever 27, which is hinged to the side of the frame as shown at 28, is swung on its pivot. A stub shaft 29, projects from the inner surface of the frame and has mounted thereon a segmental toothed disk 30, provided on its side with a cam 31, designed to engage the anti-friction roller 32, on the end of the thrust rod 18. The segmental toothed disk 30, has attached to it by the brackets 33, a segmental rack 34, the teeth of which are engaged by a dog 35, taking motion from the lever 8. The teeth of the disk 30, are engaged by a detent 36, which is pivoted to the frame as at 37, or in any other appropriate manner. The disk 30, is moved on the stub shaft by a weight 30$^a$ in order to turn the disk in a direction to carry the cam 31 into engagement with the anti-friction roller 32, which movement results in moving the thrust rod 18, longitudinally for the purpose heretofore explained. The operation just described takes place when the speed of the machine has decreased beyond the normal and the governor has operated to move the lever 27, for, as fully shown, the lever has two posts or supports which engage the dog 35, and detent 36, and as the lever 27, is raised, it operates to lift the dog and detent out of engagement with the teeth of the segmental rack and toothed disk, respectively, and as the rack and disk are released, the weight will, as stated, partially rotate the said disk. When the machine is running at its normal speed, the lever 27, will be allowed to assume its normal position and the dog 35, will, under the influence of the lever 18, move over the tooth of the segmental rack and advance the said rack step by step. The movement of the rack will be communicated to the disk and the cam 31, will be carried out of engagement with the anti-friction roller 32, thus permitting the table 13, under the influence of the weight 19, to move toward the edge of the frame and permit the grinding wheel to become operative. The toothed disk will be held in the position just described by means of the detent and the machine will continue to run with the grinding wheel in operative relation to the work support, so long as the speed of the machine remains normal.

I claim—

1. In a saw grinding machine, a frame, a shaft to which the saw is clamped, a work rest for the saw, a grinding wheel operating in conjunction with the work rest, a shaft for the grinding wheel, a table on which the shaft is mounted, means for reciprocating the table in opposite directions, a lever for reciprocating the shaft of the grinding wheel, a pitman for oscillating the lever, means whereby the shaft for the saw communicates motion to the pitman, a governor, and means whereby the governor operates to control the position of the table.

2. In a saw grinding machine, a shaft to which a saw is clamped, a grinding wheel, a shaft for rotating the grinding wheel, means for reciprocating said last named shaft, means for communicating motion of the shaft carrying the saw to the said reciprocating means, a movable support for the shaft of the grinding wheel, a governor, and means for communicating motion of the governor to the said support.

3. In a saw grinding machine, a grinding wheel, a shaft for rotating the grinding wheel, means for reciprocating the shaft, means for communicating motion of the shaft carrying the saw to the said reciprocating means, a movable support for the shaft of the grinding wheel, a governor, a thrust rod for actuating the support, and means for moving the thrust rod whereby the governor controls the movement of the support.

4. In a saw grinding machine, a shaft to which a saw is clamped, a grinding wheel, a shaft for rotating the grinding wheel, means for reciprocating said last named shaft, means for communicating motion of the shaft carrying the saw to the said reciprocating means, a movable support for the shaft of the grinding wheel, a governor, a thrust rod for actuating the support, a disk having a cam for moving the thrust rod, a governor, and means whereby the governor controls the disk.

5. In a saw grinding machine, a frame, a shaft on which a saw is mounted, a grinding wheel, means for rotating the saw, means for rotating the grinding wheel, means for communicating the motion of said shaft to reciprocate the grinding wheel, to move it toward and away from the saw, and means for controlling the position of the grinding wheel with relation to the speed of the saw.

In witness whereof, I have hereunto affixed my signature in the presence of two witnesses.

EDGAR H. STERLING.

Witnesses:
JAMES F. MOORE,
SAMUEL ALSOP.